United States Patent
Nakamoto et al.

(10) Patent No.: US 9,935,338 B2
(45) Date of Patent: Apr. 3, 2018

(54) LIQUID ELECTROLYTE FOR FLUORIDE ION BATTERY AND FLUORIDE ION BATTERY

(71) Applicants: Toyota Jidosha Kabushiki Kaisha, Toyota-shi, Aichi-ken (JP); Kyoto University, Kyoto-shi, Kyoto-fu (JP)

(72) Inventors: Hirofumi Nakamoto, Kyoto (JP); Zempachi Ogumi, Kyoto (JP); Takeshi Abe, Takatsuki (JP)

(73) Assignees: Toyota Jidosha Kabushiki Kaisha, Toyota-shi (JP); Kyoto University, Kyoto-shi (JP)

( * ) Notice: Subject to any disclaimer, the term of this patent is extended or adjusted under 35 U.S.C. 154(b) by 90 days.

(21) Appl. No.: 14/815,122

(22) Filed: Jul. 31, 2015

(65) Prior Publication Data
US 2016/0043439 A1 Feb. 11, 2016

(30) Foreign Application Priority Data
Aug. 6, 2014 (JP) .................. 2014-160028

(51) Int. Cl.
*H01M 10/0569* (2010.01)
*H01M 10/0568* (2010.01)
*H01M 10/05* (2010.01)
*H01M 10/0567* (2010.01)

(52) U.S. Cl.
CPC ....... *H01M 10/0569* (2013.01); *H01M 10/05* (2013.01); *H01M 10/0567* (2013.01); *H01M 10/0568* (2013.01); *H01M 2300/0034* (2013.01)

(58) Field of Classification Search
None
See application file for complete search history.

(56) References Cited

U.S. PATENT DOCUMENTS

| 2012/0164541 A1 | 6/2012 | Darolles et al. |
| 2012/0309981 A1* | 12/2012 | Ignatyev .................. C07F 5/02 548/110 |
| 2016/0285129 A1* | 9/2016 | Nakamoto ............ H01M 10/05 |

* cited by examiner

*Primary Examiner* — Sin J Lee
(74) *Attorney, Agent, or Firm* — Dinsmore & Shohl LLP

(57) ABSTRACT

An object of the present invention is to provide a liquid electrolyte for a fluoride ion battery allowing a reaction between an active material and a fluoride ion. By providing a liquid electrolyte for a fluoride ion battery comprising: a fluoride salt; and a sulfonium compound having a cation in which $R^1$, $R^2$, and $R^3$ ($R^1$, $R^2$, and $R^3$ each independently represent hydrogen, an alkyl group, or a fluoroalkyl group) are bound to the S element, and an anion, wherein the molar ratio of the cation relative to the total of the cation and the fluoride ion ($S^+/(S^++F^-)$) is 0.96 or more, the present invention achieves the aforementioned object.

3 Claims, 3 Drawing Sheets

LIQUID ELECTROLYTE FOR FLUORIDE ION BATTERY AND FLUORIDE ION BATTERY

TECHNICAL FIELD

The present invention relates to a liquid electrolyte for a fluoride ion battery allowing a reaction between an active material and a fluoride ion.

BACKGROUND

As a battery with high voltage and high energy density, a Li ion battery is known, for example. The Li ion battery is a cation-based battery utilizing the reaction between a Li ion and a cathode active material and also the reaction between a Li ion and an anode active material. Meanwhile, as an anion-based battery, a fluoride ion battery utilizing a fluoride ion reaction is known. In Patent Literature 1, for example, a fluoride ion battery having an anode, a cathode, an electrolyte containing a fluoride salt, and a predetermined additive is disclosed.

In claim 16 of Patent Literature 1, $R^1R^2R^3S^+F^-$ is mentioned as one example of a fluoride salt which can be selected. $R^1R^2R^3S^+F^-$ has a molar ratio of $R^1R^2R^3S^+:F^{31}=1:1$.

CITATION LIST

Patent Literature
Patent Literature 1: US 2012/0164541 A

SUMMARY OF INVENTION

Technical Problem

The fluoride ion has a problem of low activity for fluorinating an active material due to low stability of the fluoride ion. In other words, due to high reactivity of the fluoride ion, the fluoride ion reacts with other materials (liquid electrolyte, in particular) before reaction with an active material, and thus there is a problem in that the fluoride ion cannot have a sufficient reaction with an active material.

The present invention is achieved under the aforementioned circumstances, and a main object of the present invention is to provide a liquid electrolyte for a fluoride ion battery allowing a reaction between an active material and a fluoride ion.

Solution to Problem

In order to solve the above problem, the present invention provides a liquid electrolyte for a fluoride ion battery comprising: a fluoride salt; and a sulfonium compound having a cation in which $R^1$, $R^2$, and $R^3$ ($R^1$, $R^2$, and $R^3$ each independently represent hydrogen, an alkyl group, or a fluoroalkyl group) are bound to an S element, and an anion, wherein a molar ratio of the cation relative to a total of the cation and the fluoride ion ($S^+/(S^++F^-)$) is 0.96 or more.

According to the present invention, when a sulfonium compound with a specific cation structure is used at a predetermined ratio or more, a liquid electrolyte for a fluoride ion battery allowing a reaction between an active material and a fluoride ion can be provided.

Further, the present invention provides a fluoride ion battery comprising a cathode active material layer, an anode active material layer, and an electrolyte layer formed between the cathode active material layer and the anode active material layer, wherein the electrolyte layer contains the above-described liquid electrolyte for a fluoride ion battery.

According to the present invention, when the above-described liquid electrolyte for a fluoride ion battery is used, a fluoride ion battery with high capacity can be provided.

Advantageous Effects of Invention

The liquid electrolyte for a fluoride ion battery of the present invention exhibits an effect of allowing a reaction between an active material and a fluoride ion.

DESCRIPTION OF EMBODIMENTS

Hereinafter, a liquid electrolyte for a fluoride ion battery and a fluoride ion battery of the present invention will be described in detail.

A. Liquid Electrolyte for Fluoride Ion Battery

The liquid electrolyte for a fluoride ion battery of the present invention comprises: a fluoride salt; and a sulfonium compound having a cation in which $R^1$, $R^2$, and $R^3$ ($R^1$, $R^2$, and $R^3$ each independently represent hydrogen, an alkyl group, or a fluoroalkyl group) are bound to an S element, and an anion, and a molar ratio of the cation relative to a total of the cation and the fluoride ion ($S^+/(S^++F^-)$) is 0.96 or more.

According to the present invention, when a sulfonium compound with a specific cation structure is used at a predetermined ratio or more, a liquid electrolyte for a fluoride ion battery allowing a reaction between an active material and a fluoride ion can be provided. Due to the electronegativity relationship of a center element, a cation having sulfur at center of charge has weaker positive charge compared to a cation having nitrogen at center of charge. For this reason, the binding property between the cation and $F^-$ is weak, yielding higher $F^-$ activity. As a result, electrode fluorination is likely to occur.

Figure 1:
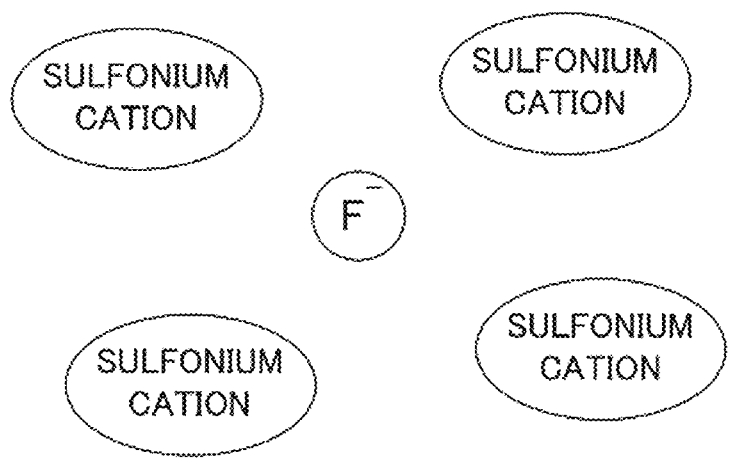
FIG. 1 is a schematic diagram for describing the presumed mechanism of the present invention.

Furthermore, in the present invention, the ratio of the sulfonium cation ($S^+/(S^++F^-)$) is used at a predetermined ratio or more. It means that, as illustrated in FIG. 1, there are many sulfonium cations present for one F. As described above, Patent Literature 1 describes use of $R^1R^2R^3S^+F^-$ as a fluoride salt. In $R^1R^2R^3S^+F^-$, $R^1R^2R^3S^+:F^-=1:1$. In such case, the sulfonium cation is highly likely to be dissociated by $F^-$, although it may vary depending on the type of a solvent to be selected or concentration of a fluoride salt. On the other hand, in the present invention, the amount of sulfonium cation is sufficiently larger than the amount of $F^-$, and thus dissociation of the sulfonium cation caused by $F^-$ can be suppressed. Furthermore, according to the present invention, as the stability of the fluoride ion is enhanced, it can also be expected to have an effect of improving Coulomb efficiency or an effect of suppressing generation of hydrofluoric acid (HF).

Hereinafter, each constitution of the liquid electrolyte for a fluoride ion battery of the present invention will be described.

1. Sulfonium Compound

In the present invention, a sulfonium compound having a cation in which $R^1$, $R^2$, and $R^3$ ($R^1$, $R^2$, and $R^3$ each independently represent hydrogen, an alkyl group, or a fluoroalkyl group) are bound to the S element, and an anion is used. The sulfonium compound is not particularly limited as long as it is a material with a specific cation. However, in particular, the sulfonium compound is preferably an ionic liquid, since the ionic liquid has low volatility. The ionic liquid in the present invention indicates a material with a melting point of 100° C. or lower. In particular, the melting point of the ionic liquid is preferably 50° C. or lower, and more preferably 25° C. or lower. Furthermore, the sulfonium compound is generally an aprotic material. Since a fluoride ion generates hydrofluoric acid upon a reaction with proton, an aprotic material is used as a liquid electrolyte. That is, the sulfonium compound in the present invention is either a material which does not react with $F^-$ or a material which substantially causes a battery reaction even if it reacts with $F^-$. Furthermore, the sulfonium compound is preferably used as a solvent for dissolving a fluoride salt.

Regarding the cation in the sulfonium compound, $R^1$, $R^2$, and $R^3$ ($R^1$, $R^2$, and $R^3$ each independently represent hydrogen, an alkyl group, or a fluoroalkyl group) are bound to the S element (cation center). It is preferable that at least one of $R^1$, $R^2$, and $R^3$ be an alkyl group or a fluoroalkyl group. That is, one of $R^1$, $R^2$, and $R^3$, two of $R^1$, $R^2$, and $R^3$, or all of $R^1$, $R^2$, and $R^3$ are preferably an alkyl group or a fluoroalkyl group.

The cation in the sulfonium compound may have a chain structure or a cyclic structure. Specific examples of the cation with a chain structure include a cation represented by the following general formula.

[Chemical Formula 1]

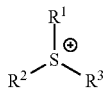

In the above general formula, $R^1$ to $R^3$ each independently represent hydrogen, an alkyl group, or a fluoroalkyl group. When $R^1$ to $R^3$ are an alkyl group or a fluoroalkyl group, the number of carbon atoms is, for example, 10 or less, preferably 6 or less, more preferably 4 or less, and even more preferably 2 or less. In particular, $R^1$ to $R^3$ are preferably hydrogen or an alkyl group or a fluoroalkyl group with 4 or less carbon atoms (in particular, 2 or less carbon atoms).

Specific examples of the cation with a cyclic structure include a cation represented by the following general formula.

[Chemical Formula 2]

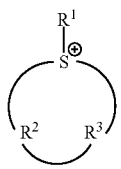

In the above general formula, $R^1$ is hydrogen, an alkyl group, or a fluoroalkyl group, $R^2$ and $R^3$ are a functional group for forming a cyclic structure and contain at least carbon. In a case where $R^1$ is an alkyl group or a fluoroalkyl group, the number of carbon atoms is, for example, 10 or less, preferably 6 or less, more preferably 4 or less, and even more preferably 2 or less. $R^1$ is particularly preferably hydrogen, or an alkyl group or a fluoroalkyl group with 4 or less carbon atoms (in particular, 2 or less carbon atoms). The cyclic structure composed of S, $R^2$, and $R^3$ may be a 5-membered ring structure, a 6-membered ring structure, or a 7-membered ring structure. Furthermore, the cyclic structure may be either aromatic or non-aromatic.

In the present invention, examples of the sulfonium cation include triethylsulfonium cation, diethylmethylsulfonium cation, tripropylsulfonium cation, and dipropylmethylsulfonium cation.

Meanwhile, since there is electric repulsion between the anion of a sulfonium compound and a fluoride ion, the anion basically does not react with a fluoride ion. For this reason, the anion type of the sulfonium compound is not particularly limited. Examples of the anion of the sulfonium compound include an amide anion represented by bisfluorosulfonylamide (FSA) anion and bistrifluoromethane sulfonylamide (TFSA) anion, a phosphate anion represented by hexafluorophosphate anion and tris(pentafluoroethyl)trifluorophosphate anion, a tetrafluoroborate (TFB) anion, and a triflate anion.

Furthermore, the solvent for the liquid electrolyte for a fluoride ion battery may be composed of the sulfonium compound only, or may be a mixture of a sulfonium compound and other solvent. The ratio of the sulfonium compound relative to whole solvent is, for example, 10 mol % or more, preferably 30 mol % or more, more preferably 50 mol % or more, even more preferably 70 mol % or more, and particularly preferably 90 mol % or more.

As for the other solvent, an ionic liquid and a non-aqueous solvent can be exemplified. Examples of the cation of an ionic liquid include a piperidinium skeleton cation, a pyrrolidinium skeleton cation, an imidazolium skeleton cation, an ammonium cation, and a phosphonium cation.

Examples of the anion of an ionic liquid include an amide anion represented by bisfluorosulfonylamide (FSA) anion and bistrifluoromethane sulfonylamide (TFSA) anion, a phosphate anion represented by hexafluorophosphate anion and tris(pentafluoroethyl)trifluorophosphate anion, a tetrafluoroborate (TFB) anion, and a triflate anion.

The type of the non-aqueous solvent is not particularly limited, and examples thereof include ethylene carbonate (EC), fluoroethylene carbonate (FEC), difluoroethylene carbonate (DFEC), propylene carbonate (PC), dimethyl carbonate (DMC), diethyl carbonate (DEC), ethyl methyl carbonate (EMC), butylene carbonate (BC), γ-butyrolactone, sulfolane, acetonitrile, 1,2-dimethoxymethane, 1,3-dimethoxypropane, diethyl ether, tetrahydrofuran, 2-methyltetrahydrofuran, dimethyl sulfoxide (DMSO), and a mixture of any of them.

2. Fluoride Salt

In the present invention, the fluoride salt is not particularly limited as long as it generates a fluoride ion which reacts with an active material. The fluoride salt may be an organic fluoride salt or an inorganic fluoride salt. Furthermore, the fluoride salt may be an ionic liquid.

The cation of the fluoride salt is not particularly limited, and examples thereof include a complex cation. Examples of the complex cation include an alkylammonium cation, an alkylphosphonium cation, and an alkylsulfonium cation.

Examples of the alkylammonium cation include a cation represented by the following general formula.

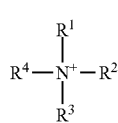

[Chemical Formula 3]

In the above general formula, $R^1$ to $R^4$ each independently represent an alkyl group or a fluoroalkyl group. The number of carbon atoms of $R^1$ to $R^4$ is, for example, 10 or less, and may be 5 or less, or 3 or less.

The anion of the fluoride salt is not particularly limited as long as it generates a fluoride ion which reacts with an active material. In particular, $F^-$ is preferred.

3. Liquid Electrolyte for Fluoride Ion Battery

According to the present invention, when a sulfonium compound with a specific cation structure is used at a predetermined ratio or more, a liquid electrolyte for a fluoride ion battery allowing a reaction between an active material and a fluoride ion can be provided. When the molar ratio of the sulfonium cation relative to the total of the sulfonium cation and the fluoride ion is $S^+/(S^++F^-)$, $S^+/(S^++F^-)$ is generally 0.96 or more. This is because, if $S^+/(S^++F^-)$ is excessively low, $F^-$ concentration becomes relatively high so that dissociation of sulfonium cation occurs. Meanwhile, $S^+/(S^++F^-)$ is generally 0.999 or less, and preferably 0.994 or less. This is because, if $S^+/(S^++F^-)$ is excessively high, $F^-$ concentration becomes relatively low so that ion conductivity may be lowered. Furthermore, the molar ratio of the sulfonium cation relative to the fluoride ion, that is, $(S^+/F^-)$, is preferably 24 or more, for example. The molar ratio $(S^+/F^-)$ is preferably 1000 or less, for example. Those molar ratios can be calculated based on the concentration of the sulfonium cation and the fluoride ion that are included in a liquid electrolyte. Those concentrations can be obtained from $^{19}F$-NMR or $^{1}H$-NMR, for example.

The fluoride salt concentration in the liquid electrolyte for a fluoride ion battery is preferably 10 mol % or less, for example. Meanwhile, the fluoride salt concentration is preferably 0.5 mol % or more, and more preferably 1 mol % or more, for example.

Incidentally, it is difficult for $F^-$ to dissociate from HF in $F(HF)_x^-$ anion. For this reason, sufficient fluorination of an active material is not easily obtained in some cases. Incidentally, "x" is a real number larger than 0, and satisfies the relationship of $0<x\leq5$, for example. For this reason, it is preferable that the liquid electrolyte for a fluoride ion battery contain substantially no $F(HF)_x^-$ anion. The expression "contain substantially no $F(HF)_x^-$ anion" means that the ratio of $F(HF)_x^-$ anion relative to the whole anions present in the liquid electrolyte is 0.5 mol % or less. The ratio of $F(HF)_x^-$ anion is preferably 0.3 mol % or less.

B. Fluoride Ion Battery

Figure 2:
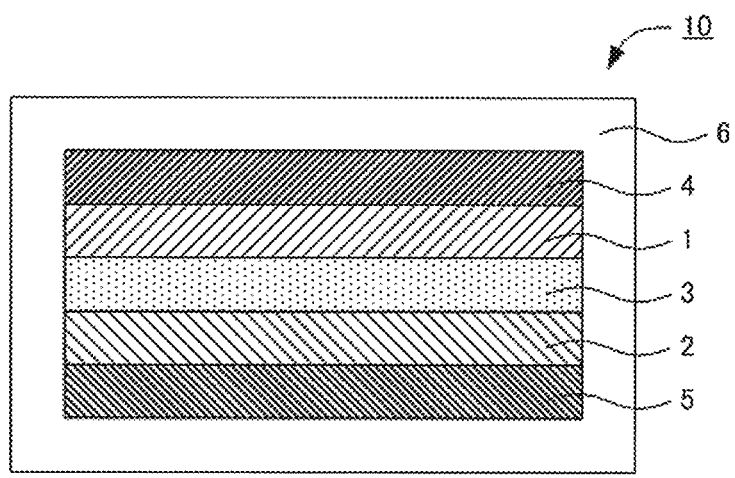
FIG. 2 is a schematic cross-sectional view illustrating an exemplary fluoride ion battery of the present invention.

FIG. 2 is a schematic cross-sectional view illustrating an exemplary fluoride ion battery of the present invention. A fluoride ion battery 10 illustrated in FIG. 2 comprises a cathode active material layer 1, an anode active material layer 2, an electrolyte layer 3 formed between the cathode active material layer 1 and the anode active material layer 2, a cathode current collector 4 for collecting current by the cathode active material layer 1, a anode current collector 5 for collecting current by the anode active material layer 2, and a battery case 6 for containing those members. Furthermore, the electrolyte layer 3 contains "A. Liquid Electrolyte for Fluoride Ion Battery" which is described above.

According to the present invention, when the aforementioned liquid electrolyte for a fluoride ion battery is used, a fluoride ion battery with large capacity can be provided.

Hereinafter, each constitution of the fluoride ion battery of the present invention will be described.

1. Electrolyte Layer

The electrolyte layer in the present invention is a layer which is formed between the cathode active material layer and the anode active material layer. In the present invention, the electrolyte layer contains the aforementioned liquid electrolyte for a fluoride ion battery. The thickness of the electrolyte layer varies greatly depending on the constitution of a battery, and is not particularly limited.

2. Cathode Active Material Layer

The cathode active material layer in the present invention is a layer which contains at least a cathode active material. Furthermore, the cathode active material layer may further contain at least one of a conductive material and a binder, in addition to a cathode active material.

The cathode active material in the present invention is an active material which generally de-fluorinates at discharge. Examples of the cathode active material include a metal element, an alloy, a metal oxide, and a fluoride thereof. Examples of the metal element included in the cathode active material include Cu, Ag, Ni, Co, Pb, Ce, Mn, Au, Pt, Rh, V, Os, Ru, Fe, Cr, Bi, Nb, Sb, Ti, Sn, and Zn. Among them, the cathode active material is preferably Cu, $CuF_x$, Pb, $PbF_x$, Bi, $BiF_x$, Ag, or $AgF_x$. Incidentally, "x" is a real number larger than 0. Cu and $CuF_x$ are a material with high energy density, and they are preferable from such point of view. Other examples of the cathode active material include a carbon material and a fluoride thereof. Examples of the carbon material include graphites, cokes, and carbon nanotubes. Furthermore, other examples of the cathode active material include a polymer material. Examples of the polymer material include polyaniline, polypyrrole, polyacetylene, and polythiophene.

The conductive material is not particularly limited as long as it has desired electron conductivity. Examples thereof include a carbon material. Examples of the carbon material include carbon black such as acetylene black, ketjen black, furnace black, graphene, fullerene, carbon nano tube, or thermal black. Meanwhile, the binder is not particularly limited as long as it is chemically and electrically stable. Examples thereof include a fluorine-based binder such as polyvinylidene fluoride (PVDF) and polytetrafluoroethylene (PTFE). Furthermore, higher content of the cathode active material in the cathode active material layer is preferred from the viewpoint of capacity. Furthermore, the thickness of the cathode active material layer varies greatly depending on the constitution of a battery, and is not particularly limited.

3. Anode Active Material Layer

The anode active material layer in the present invention is a layer which contains at least an anode active material. Furthermore, the anode active material layer may further contain at least one of a conductive material and a binder, in addition to an anode active material.

The anode active material in the present invention is an active material which generally fluorinates at discharge. As for the anode active material, any active material having lower potential than that of the cathode active material can be selected. For these reasons, the aforementioned cathode active material may be also used as an anode active material. Examples of the anode active material include a metal element, an alloy, a metal oxide, and a fluoride thereof. Examples of the metal element included in the anode active material include La, Ca, Al, Eu, Li, Si, Ge, Sn, In, V, Cd, Cr, Fe, Zn, Ga, Ti, Nb, Mn, Yb, Zr, Sm, Ce, Mg, and Pb. Among them, the anode active material is preferably Mg, $MgF_x$, Al, $AlF_x$, Ce, $CeF_x$, Ca, $CaF_x$, La, $LaFx$, Pb, or $PbF_x$. Incidentally, "x" is a real number larger than 0. Furthermore, as the anode active material, the aforementioned carbon material and polymer material can be also used.

The same conductive material and binder as those described above for the cathode active material layer can be also used. Furthermore, higher content of the anode active material in the anode active material layer is preferred from the viewpoint of capacity. Furthermore, the thickness of the anode active material layer varies greatly depending on the constitution of a battery, and is not particularly limited.

4. Other Constitutions

The fluoride ion battery of the present invention comprises at least the anode active material layer, the cathode active material layer, and the electrolyte layer that are described above. Furthermore, the fluoride ion battery generally comprises a cathode current collector for collecting current by the cathode active material layer and an anode current collector for collecting current by the anode active material layer. Examples of the shape of the current collector include a thin film shape, a mesh shape, and a porous shape. Furthermore, the fluoride ion battery of the present invention may have a separator between the cathode active material layer and the anode active material layer, since a battery having even higher safety can be obtained.

5. Fluoride Ion Battery

The fluoride ion battery of the present invention is not particularly limited as long as it has the cathode active material layer, the anode active material layer, and the electrolyte layer that are described above. In addition, the fluoride ion battery of the present invention may be a primary battery or a secondary battery. In particular, a secondary battery is preferable, since the secondary battery can be repeatedly charged and discharged and is useful as, for example, a battery mounted on an automobile. Examples of the shape of the fluoride ion battery of the present invention include a coin shape, a laminate shape, a cylindrical shape, and a square shape.

Incidentally, the present invention is not limited to the embodiments described above. The above embodiments are merely an exemplification and any of those having substantially the same constitution as the technical idea described in Claims of the present invention and exhibiting the same working effects as those are included in the technical scope of the present invention.

EXAMPLES

Hereinafter, the present invention will be described in more detail by means of Examples.

Example 1

Tetramethylammonium fluoride (TMAF, fluoride salt, manufactured by Aldrich) and triethylsulfonium bistrifluoromethane sulfonylamide (S222TFSA, sulfonium compound, manufactured by IoLiTec Ionic Liquids Technologies GmbH) were weighed and mixed with each other at a molar ratio of fluoride salt:sulfonium compound=1:50. After that, the resultant mixture was stirred under conditions of 25° C. for 15 hours within a sealed container made of a fluororesin, thereby obtaining a liquid electrolyte for evaluation.

Example 2

A liquid electrolyte for evaluation was obtained in the same manner as in Example 1, except that weighing and mixing was performed at a molar ratio of fluoride salt:sulfonium compound=1:24.

Example 3

A liquid electrolyte for evaluation was obtained in the same manner as in Example 1, except that weighing and mixing was performed at a molar ratio of fluoride salt:sulfonium compound=1:165.

Comparative Example 1

A liquid electrolyte for evaluation was obtained in the same manner as in Example 1, except that weighing and mixing was performed at a molar ratio of fluoride salt:sulfonium compound=1:10.

Comparative Example 2

Figure 3:
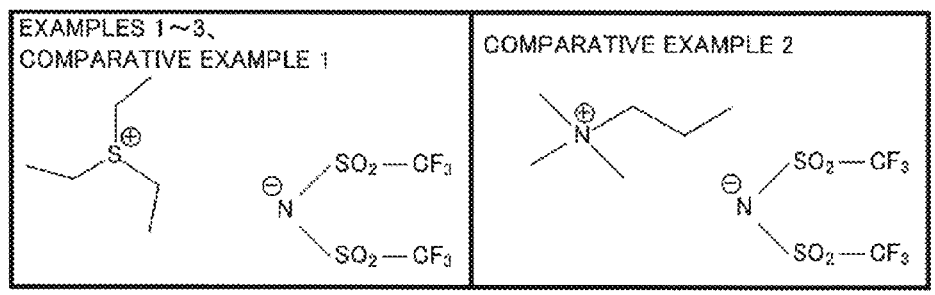
FIG. 3 shows compounds used in Examples 1 to 3 and Comparative Examples 1 and 2.

A liquid electrolyte for evaluation was obtained in the same manner as in Example 1, except that N, N, N-trimethyl-N-propylammonium bistrifluoromethane sulfonylamide (N1113TFSA, manufactured by Kanto Chemical Co., Inc.) was used instead of the sulfonium compound. Incidentally, in FIG. 3, chemical formulas of compounds used in Examples 1 to 3 and Comparative Examples 1 and 2 are shown. Furthermore, in Table 1, the sulfonium cation ratio ($S^+/(S^++F^-)$) is shown.

TABLE 1

|  | TMAF:SSSTFSA | $S^+/(S^+ + F^-)$ |
|---|---|---|
| EXAMPLE 1 | 1:50 | 0.9804 |
| EXAMPLE 2 | 1:24 | 0.9600 |
| EXAMPLE 3 | 1:165 | 0.9940 |
| COMPRATIVE EXAMPLE 1 | 1:10 | 0.9091 |
| COMPRATIVE EXAMPL 2 | — | — |

[Evaluation]
(Measurement of Cyclic Voltammetry)

CV measurement was performed for the liquid electrolyte for evaluation obtained in each of Examples 1 and 2 and Comparative Examples 1 and 2. Specifically, the evaluation was made by using a dip type three-electrode cell in a glove box under Ar atmosphere. For an acting electrode, a Pt plate or a Cu plate was used. For a counter electrode, a composite electrode composed of PTFE, acetylene black (AB), and fluorinated carbon was used. Incidentally, the composite electrode is an electrode with a weight ratio of PTFE:AB:fluorinated carbon=1:2:7. Furthermore, by using vycor glass, a reference electrode was separated from the liquid electrolyte for evaluation. Incidentally, as for the reference electrode, Ag wire immersed in an acetonitrile solution, in which each of silver nitrate and tetrabutyl ammonium perchlorate is dissolved at a concentration of 0.1 N, was used. Furthermore, the measurement was performed under conditions of room temperature and a sweep rate of 1 mV/s.

Figure 4:
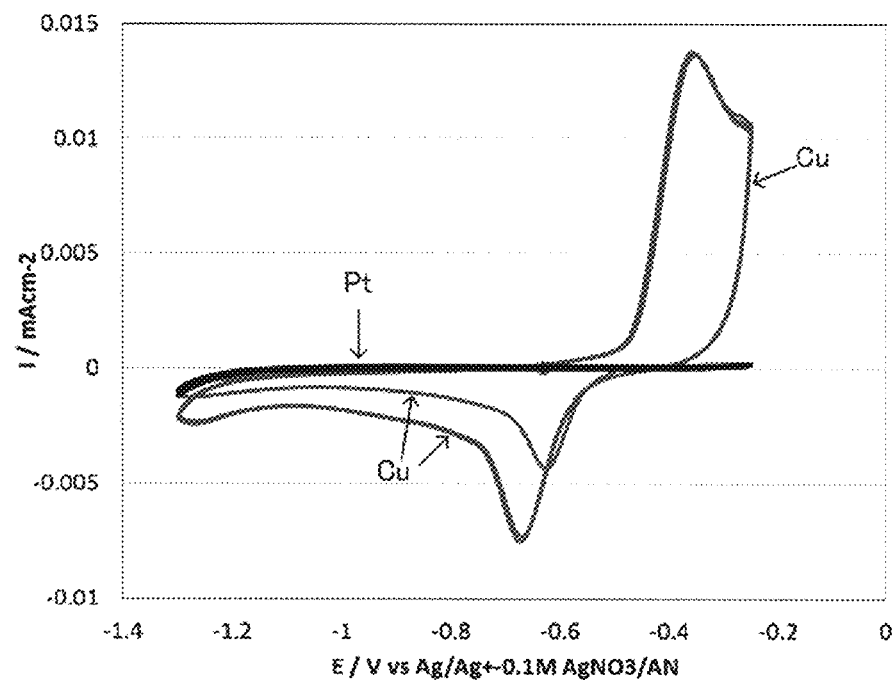
FIG. 4 shows the result of CV measurement of the liquid electrolyte for evaluation obtained in Example 1.

FIG. 4 shows the result of CV measurement of the liquid electrolyte for evaluation obtained in Example 1. As shown in FIG. 4, it was confirmed that there was no degradation of the liquid electrolyte for evaluation within the measurement range when a Pt electrode was used. Furthermore, when a Cu electrode was used, an oxidation current peak accompanied with fluorination of copper was determined around −0.4 V, and also reduction current peak accompanied with de-fluorination of copper fluoride was determined around −0.7 V.

Figure 5:
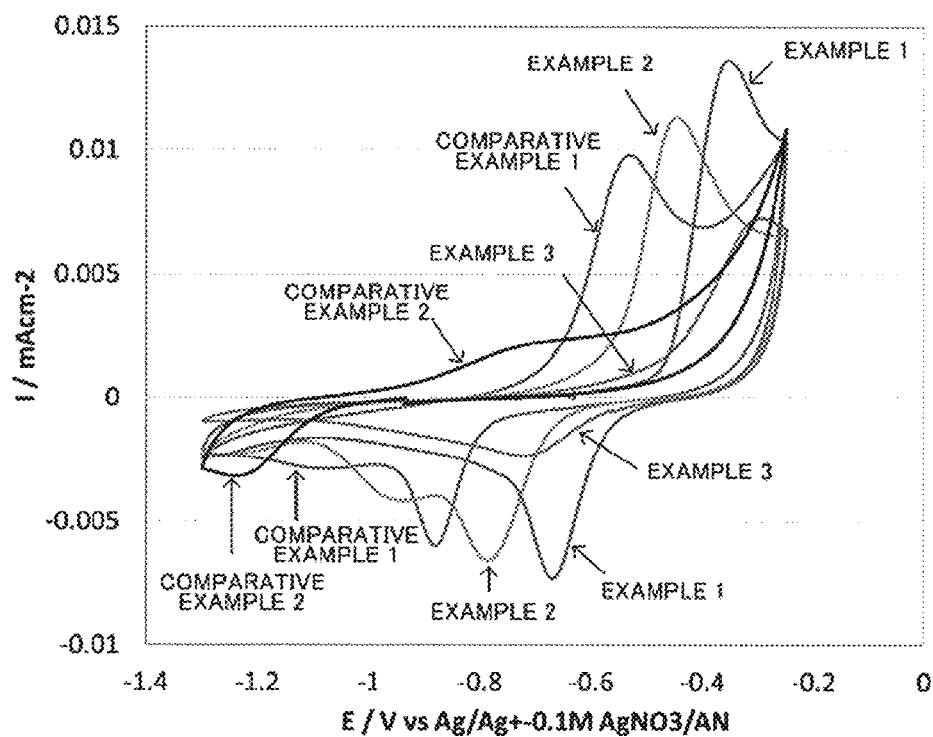
FIG. 5 shows the result of CV measurement of the liquid electrolyte for evaluation obtained in each of Examples 1 to 3 and Comparative Examples 1 and 2.

FIG. 5 shows the result of CV measurement of the liquid electrolyte for evaluation obtained in each of Examples 1 to 3 and Comparative Examples 1 and 2. As shown in FIG. 5, in Examples 1 to 3, an oxidation current peak accompanied with fluorination of copper was determined around −0.4 V, and also reduction current peak accompanied with de-fluorination of copper fluoride was determined around −0.7 V. Accordingly, when the sulfonium cation ratio is 0.96 or more, it was possible to confirm the fluorination and de-fluorination of a metal. Meanwhile, unlike Examples 1 and 2, an oxidation current peak accompanied with fluorination of copper and reduction current peak accompanied with de-fluorination of copper fluoride were not shown in Comparative Examples 1 and 2. Furthermore, in the case of Example 2 and Comparative Example 1 in which the sulfonium cation ratio is relatively low (fluoride ion ratio is relatively high), a dissociation current peak which is different from the reduction current peak accompanied with de-fluorination of copper fluoride was determined around −1 V. In Comparative Example 1, in particular, gas generation accompanied with dissociation of the sulfonium compound was shown during the manufacture of a liquid electrolyte. According to the present invention, it is preferable that there be no dissociation current peak determined around −1 V. Similarly, it is also preferable that there be no gas generation accompanied with dissociation of a sulfonium compound.

REFERENCE SIGNS LIST

1 cathode active material layer
2 anode active material layer
3 electrolyte layer
4 cathode current collector
5 anode current collector
6 battery case
10 fluoride ion battery

What is claimed is:

1. A liquid electrolyte for a fluoride ion battery comprising:
   a fluoride salt that generates a fluoride ion that reacts with an active material; and
   a sulfonium compound having a cation in which $R^1$, $R^2$, and $R^3$ ($R^1$, $R^2$, and $R^3$ each independently represent hydrogen, an alkyl group, or a fluoroalkyl group) are bound to an S element, and an anion,
   wherein a molar ratio of the cation relative to a total of the cation and the fluoride ion ($S^+/(S^++F^-)$) is 0.96 or more.

2. A fluoride ion battery comprising a cathode active material layer, an anode active material layer, and an electrolyte layer formed between the cathode active material layer and the anode active material layer,
   wherein the electrolyte layer contains the liquid electrolyte for a fluoride ion battery according to claim 1.

3. A fluoride ion battery comprising:
   a cathode active material layer;
   an anode active material layer; and
   an electrolyte layer formed between the cathode active material layer and the anode active material layer, the electrolyte layer contains a liquid electrolyte,
   wherein the liquid electrolyte contains a fluoride salt and a sulfonium compound having a cation in which $R^1$, $R^2$, and $R^3$ ($R^1$, $R^2$, and $R^3$ each independently represent hydrogen, an alkyl group, or a fluoroalkyl group) are bound to an S element, and an anion,
   wherein a molar ratio of the cation relative to a total of the cation and the fluoride ion ($S^+/(S^++F^-)$) is 0.96 or more.

* * * * *

UNITED STATES PATENT AND TRADEMARK OFFICE
CERTIFICATE OF CORRECTION

PATENT NO. : 9,935,338 B2  
APPLICATION NO. : 14/815122  
DATED : April 3, 2018  
INVENTOR(S) : Hirofumi Nakamoto, Zempachi Ogumi and Takeshi Abe Page 1 of 1

It is certified that error appears in the above-identified patent and that said Letters Patent is hereby corrected as shown below:

In the Specification

In Column 1, Line 25, delete "$R^1R^2R^3S^+:F^{31}$", insert -- $R^1R^2R^3S^+ : F^-$ --, therefor.

Signed and Sealed this  
Fifteenth Day of May, 2018

Andrei Iancu  
*Director of the United States Patent and Trademark Office*